United States Patent
Kawasumi et al.

(10) Patent No.: US 10,731,757 B2
(45) Date of Patent: Aug. 4, 2020

(54) CONTROL DEVICE OF CONTINUOUSLY VARIABLE TRANSMISSION AND CONTROL METHOD OF CONTINUOUSLY VARIABLE TRANSMISSION

(71) Applicant: JATCO Ltd, Fuji-shi, Shizuoka (JP)

(72) Inventors: Takurou Kawasumi, Ebina (JP); Ken Okahara, Atsugi (JP); Midori Yamaguchi, Yokohama (JP); Masahiro Yamamoto, Zama (JP); Hiroki Iwasa, Atsugi (JP); Hiroki Kumashiro, Atsugi (JP); Masayuki Shimizu, Ayase (JP); Ryuuichi Furukawa, Sagamihara (JP); Kenichi Mori, Kanagawa (JP); Kazutaka Adachi, Kanagawa (JP); Yutaka Kaneko, Kanagawa (JP); Hiroyuki Ashizawa, Kanagawa (JP)

(73) Assignee: JATCO LTD, Fuji-Shi (JP)

( * ) Notice: Subject to any disclaimer, the term of this patent is extended or adjusted under 35 U.S.C. 154(b) by 14 days.

(21) Appl. No.: 16/083,431

(22) PCT Filed: Feb. 27, 2017

(86) PCT No.: PCT/JP2017/007380
§ 371 (c)(1),
(2) Date: Sep. 7, 2018

(87) PCT Pub. No.: WO2017/154632
PCT Pub. Date: Sep. 14, 2017

(65) Prior Publication Data
US 2019/0078685 A1    Mar. 14, 2019

(30) Foreign Application Priority Data

Mar. 9, 2016    (JP) .................. 2016-045497

(51) Int. Cl.
*F16H 61/662*    (2006.01)
*F16H 61/70*    (2006.01)
(Continued)

(52) U.S. Cl.
CPC ..... *F16H 61/66259* (2013.01); *B60W 10/107* (2013.01); *F16H 59/14* (2013.01);
(Continued)

(58) Field of Classification Search
CPC ......... F16H 61/66259; F16H 61/66227; F16H 61/702; F16H 59/14; F16H 59/40;
(Continued)

(56) References Cited

U.S. PATENT DOCUMENTS 5,993,338 A    11/1999 Kato et al.
2002/0114099 A1    8/2002 Nakayama

FOREIGN PATENT DOCUMENTS

EP    2 873 893 A1    5/2015
JP    H11-194801 A    7/1999
(Continued)

*Primary Examiner* — Huan Le
(74) *Attorney, Agent, or Firm* — Foley & Lardner LLP (57) ABSTRACT

The controller performs shift control of the transmission such that an actual pressure of a primary pressure becomes an indicating pressure. The controller includes a phase advance compensator which performs advance compensation of the indicating pressure, and a setting unit which sets an indicating pressure on which the advance compensation is performed by the phase advance compensator as the indicating pressure, in accordance with at least one of a rotation speed of a primary pulley, an input torque to a secondary pulley, a speed ratio, or a changing rate.

10 Claims, 5 Drawing Sheets

(51) Int. Cl.
  *B60W 10/107* (2012.01)
  *F16H 59/14* (2006.01)
  *F16H 59/40* (2006.01)
  *F16H 59/42* (2006.01)

(52) U.S. Cl.
  CPC ....... *F16H 59/40* (2013.01); *F16H 61/66227* (2013.01); *F16H 61/702* (2013.01); *F16H 59/42* (2013.01); *F16H 2059/148* (2013.01)

(58) Field of Classification Search
  CPC .. F16H 59/42; F16H 2059/148; F16H 61/662; B60W 10/107
  See application file for complete search history.

(56) References Cited

FOREIGN PATENT DOCUMENTS

| | | |
|---|---|---|
| JP | 2002-106700 A | 4/2002 |
| JP | 2002-124047 A | 4/2002 |

CONTROL DEVICE OF CONTINUOUSLY VARIABLE TRANSMISSION AND CONTROL METHOD OF CONTINUOUSLY VARIABLE TRANSMISSION

TECHNICAL FIELD

The present invention relates to a control device of a continuously variable transmission and a control method of a continuously variable transmission.

BACKGROUND ART

Regarding shift control of a continuously variable transmission, JP11-194801A discloses a following technique. That is, as a technique of controlling a sliding mode of a continuously variable transmission, a technique which sets a switching surface on a phase space of the sliding mode control so as to have a phase advance/delay characteristic corresponding to an actual value of a hunting frequency is disclosed (see paragraph [0120]).

SUMMARY OF INVENTION

In the continuously variable transmission, longitudinal vibration which causes longitudinal rocking at a resonance frequency of a power train is generated. When a stability of a speed ratio of the continuously variable transmission with respect to a torque fluctuation of the power train is insufficient, it is considered that the torque fluctuation is coupled to the shift of the continuously variable transmission to generate the longitudinal vibration. When the longitudinal vibration is generated, there is a fear that a drivability of a vehicle mounted with a continuously variable transmission is deteriorated. Therefore, a technique for appropriately improving the longitudinal vibration of the continuously variable transmission is desired.

The present invention has been made in an effort to provide a control device of a continuously variable transmission and a control method of a continuously variable transmission which are capable of appropriately improving a longitudinal vibration of the continuously variable transmission.

In one aspect of the present invention, a control device of a continuously variable transmission which performs shift control of the continuously variable transmission such that an actual shift control value becomes a desired shift control value is provided. The control device in this aspect includes an advance compensating unit configured to perform advance compensation of the desired shift control value, and a setting unit configured to set a compensated desired shift control value on which the advance compensation is performed by the advance compensating unit as the desired shift control value, in accordance with at least one of an input-side rotation speed of the continuously variable transmission, an input torque to a driven-side rotation element of the continuously variable transmission, a speed ratio of the continuously variable transmission, or a changing rate of the speed ratio.

In another aspect of the present invention, a control method of a continuously variable transmission which performs shift control of the continuously variable transmission such that an actual shift control value becomes a desired shift control value is provided. The control method in this aspect performs advance compensation of the desired shift control value, and sets a compensated desired shift control value on which the advance compensation is performed as the desired shift control value, in accordance with at least one of a rotation speed of an input side of the continuously variable transmission, an input torque to a driven-side rotation element of the continuously variable transmission, a speed ratio of the continuously variable transmission, or a changing rate of the speed ratio.

According to the above aspects, in a region where the longitudinal vibration is generated, it is possible to set a compensated desired shift control value as a desired shift control value. Therefore, it is possible to improve the stability of the speed ratio of the continuously variable transmission by the advance compensation of the desired shift control value as necessary and thus the longitudinal vibration of the continuously variable transmission may be appropriately improved by converging the longitudinal vibration. Further, the stability of the speed ratio is increased by the phase advance compensation so that it is possible to improve the control responsibility of the speed ratio.

DESCRIPTION OF EMBODIMENTS

Hereinafter, an exemplary embodiment of the present invention will be described with reference to the accompanying drawings.

Figure 1:
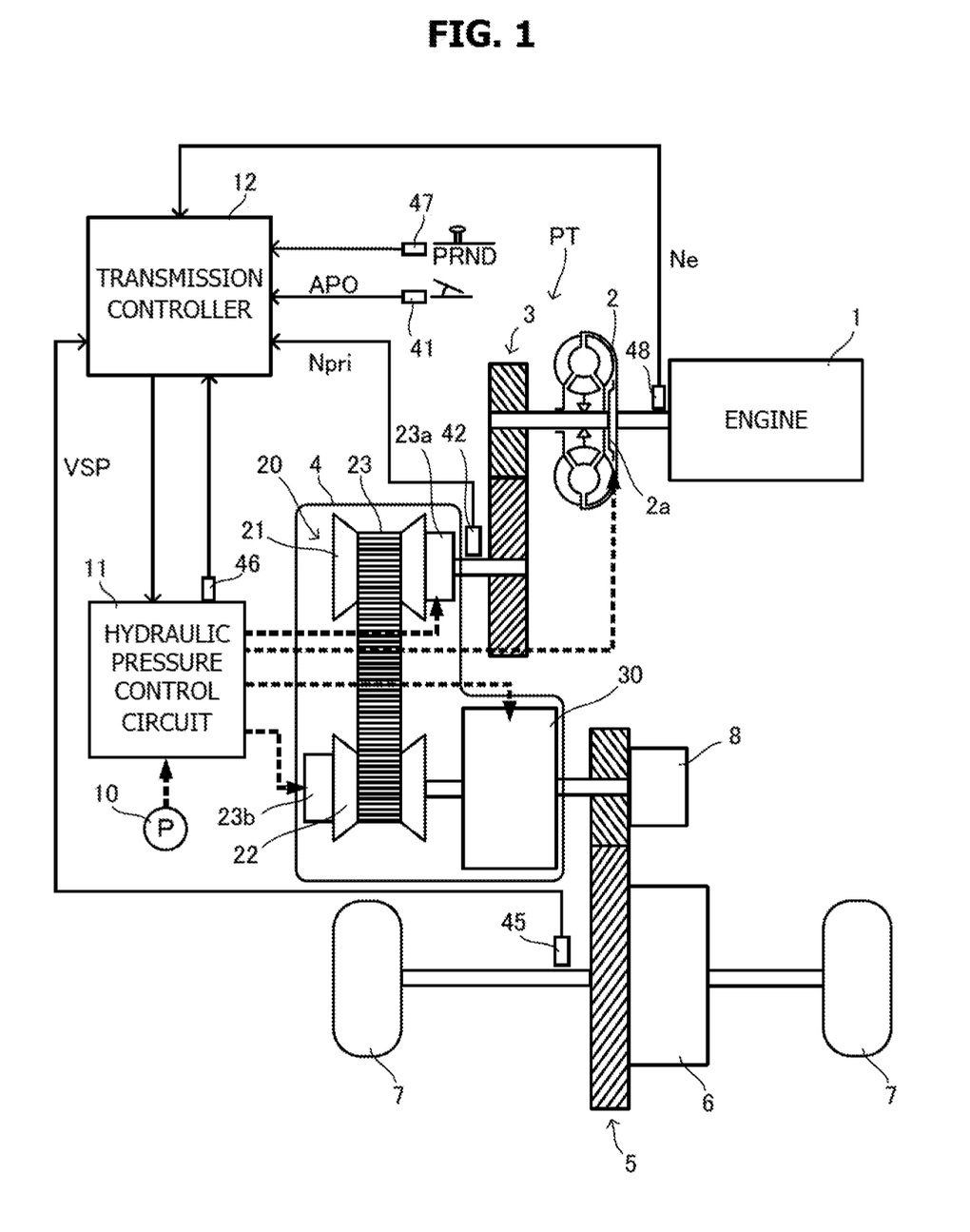
FIG. 1 is a schematic diagram of a vehicle including a transmission controller.

FIG. 1 is a schematic diagram of a vehicle including a transmission controller 12. A vehicle includes an engine 1 as a power source. The power of the engine 1 is transmitted to a driving wheel 7 via a torque converter 2, a first gear train 3, a transmission 4, a second gear train 5, and a differential device 6 which configure a power train PT. The second gear train 5 is equipped with a parking mechanism 8 for mechanically locking an output shaft of the transmission 4 so as not to rotate at the time of parking.

The torque converter 2 includes a lock-up clutch 2a. When the lock-up clutch 2a is engaged, slippage in the torque converter 2 is eliminated so that a transmission efficiency of the torque converter 2 is improved. Hereinafter, the lock-up clutch 2a is referred to as an LU clutch 2a.

The transmission 4 is a continuously variable transmission including a variator 20. The variator 20 is a continuously variable transmission mechanism which includes a primary pulley 21, a secondary pulley 22, and a belt 23 which is wound between the pulleys 21 and 22. The pulley 21 configures a driving side rotation element and the pulley 22 configures a driven side rotation element.

Each of the pulleys 21 and 22 includes a fixed conical plate, a movable conical plate which is disposed in a state in which a sheave surface is opposite to the fixed conical plate and has a V-shaped groove between the fixed conical plate and the movable conical plate, and a hydraulic cylinder which is disposed on a rear surface of the movable conical plate to axially displace the movable conical plate. The pulley 21 includes a hydraulic cylinder 23a as a hydraulic cylinder and the pulley 22 includes a hydraulic cylinder 23b as a hydraulic cylinder.

When a hydraulic pressure which is supplied to the hydraulic cylinders 23a and 23b is adjusted, a width of the V-shaped groove is changed so that a contact radius between the belt 23 and each of the pulleys 21 and 22 changes and a speed ratio Ratio of the variator 20 continuously changes. The variator 20 is a toroidal continuously variable transmission mechanism.

The transmission 4 further includes a sub-transmission mechanism. The sub-transmission mechanism 30 is a transmission mechanism of two forward gear positions and one reverse gear position and has a first speed and a second speed which has a low speed ratio than the first speed as forward gear positions. The sub-transmission mechanism 30 is provided to be serial to the variator 20 in a power transmission path from the engine 1 to the driving wheel 7.

The sub-transmission mechanism 30 may be directly connected to an output shaft of the variator 20 as in the example or may be connected to the output shaft via a power transmission mechanism such as a shift or gear train. Alternately, the sub-transmission mechanism 30 may be connected to the input shaft of the variator 20.

In the vehicle, an oil pump which is driven using a part of a power of the engine 1, a hydraulic pressure control circuit 11 which adjusts a hydraulic pressure generated by the oil supplied from the oil pump 10 to supply the hydraulic pressure to individual parts of the transmission 4, and a transmission controller 12 which controls the hydraulic pressure control circuit 11 are further provided.

The hydraulic pressure control circuit 11 is configured by a plurality of flow passages and a plurality of hydraulic pressure control valves. The hydraulic pressure control circuit 11 controls the plurality of hydraulic pressure control valves based on a shift control signal from the transmission controller 12 to switch a hydraulic pressure supply passage. Further, the hydraulic pressure control circuit 11 adjusts a necessary hydraulic pressure from a hydraulic pressure generated by the oil supplied from the oil pump 10 and supplies the adjusted hydraulic pressure to individual parts of the transmission 4. By doing this, shift of the variator 20, change of a gear position of the sub-transmission mechanism 30, and engagement/disengagement of the LU clutch 2a are performed.

Figure 2:
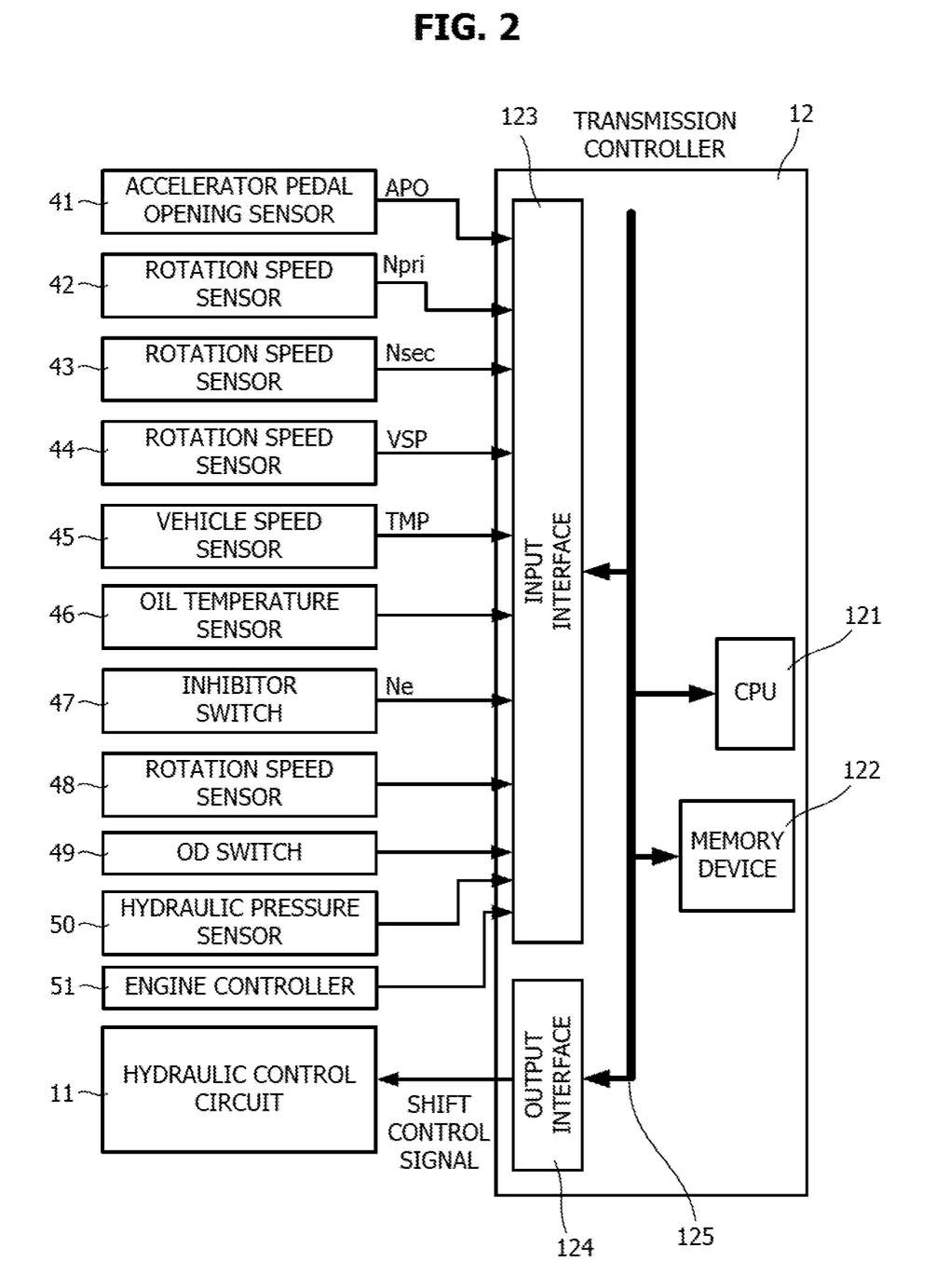
FIG. 2 is a schematic diagram of a transmission controller.

FIG. 2 is a schematic diagram of a transmission controller 12. The transmission controller 12 includes a CPU 121, a memory device 122 which is configured by an RAM and an ROM, an input interface 123, an output interface 124, and a bus 125 which connects the above-mentioned components.

For example, an output signal of an accelerator pedal opening sensor 41 which detects an accelerator pedal opening APO representing an operation amount of an accelerator pedal, an output signal of a rotation speed sensor 42 which detects an input-side rotation speed of the transmission 4, an output signal of the rotation speed sensor 43 which detects a rotation speed Nsec of the pulley 22, and an output signal of a rotation speed sensor 44 which detects an output-side rotation speed of the transmission 4 are input to the input interface 123.

Specifically, the input-side rotation speed of the transmission 4 is a rotation speed Npri of the input shaft of the transmission 4, that is, a rotation speed Npri of the pulley 21. The output-side rotation speed of the transmission 4 is specifically a rotation speed of the output shaft of the transmission, that is, a rotation speed of the output shaft of the sub-transmission mechanism 30. The input-side rotation speed of the transmission 4 may be a rotation speed in a position where a gear train is sandwiched between the transmission 4 and the torque converter 2, such as a turbine rotation speed of the torque converter 2. The output-side rotation speed of the transmission 4 is the same as the above.

An output signal of a vehicle speed sensor 45 which detects a vehicle speed VSP, an output signal of an oil temperature sensor 46 which detects an oil temperature TMP of the transmission 4, an output signal of an inhibitor switch 47 which detects a position of a select lever, an output signal of a rotation speed sensor 48 which detects a rotation speed Ne of the engine 1, an output signal of an OD switch 49 for increasing a shift coverage of the transmission 4 to a speed ratio smaller than 1, an output signal of a hydraulic pressure sensor 50 which detects a hydraulic pressure supplied to the LU clutch 2a are input to the input interface 123. A torque signal of an engine torque Te from an engine controller 51 which is provided in the engine 1 is also input to the input interface 123.

A shift control program of the transmission 4 and various maps used for the shift control program are stored in the memory device 122. The CPU 121 reads and executes the shift control program stored in the memory device 122 and generates a shift control signal based on various signals input via the input interface 123. The CPU 121 outputs the generated shift control signal to the hydraulic pressure control circuit 11 via the output interface 124. Various values which are used for arithmetic processings of the CPU 121 and arithmetic results of the CPU 121 are appropriately stored in the memory device.

However, in the transmission 4, a longitudinal vibration may be generated at a PT resonance frequency Fpt which is a resonance frequency of the power train PT. When a stability of a speed ratio of the transmission 4 with respect to a torque fluctuation of the power train is insufficient, it is considered that the torque fluctuation is coupled to the shift of the transmission 4 to generate the longitudinal vibration. When the longitudinal vibration is generated, there is a fear that a drivability of a vehicle mounted with the transmission 4 is deteriorated.

Therefore, the transmission controller 12 performs the shift control which will be described below. Hereinafter, as the speed ratio of the transmission 4, a speed ratio Ratio of the variator 20 is used. The speed ratio Ratio is a generic name of the speed ratio of the variator 20 including an actual speed ratio Ratio_A, a desired speed ratio Ratio_D, and a target speed ratio Ratio_T, which will be described below and includes at least any one of them. A primary pressure Ppri which is a hydraulic pressure supplied to the pulley 21 and a secondary pressure Psec which is a hydraulic pressure supplied to the pulley 22 are the same as the above. The speed ratio of the transmission 4 may be a through speed ratio which is a total speed ratio of the variator 20 and the sub-transmission mechanism 30. Hereinafter, the transmission controller 12 is simply referred to as a controller 12.

Figure 3:
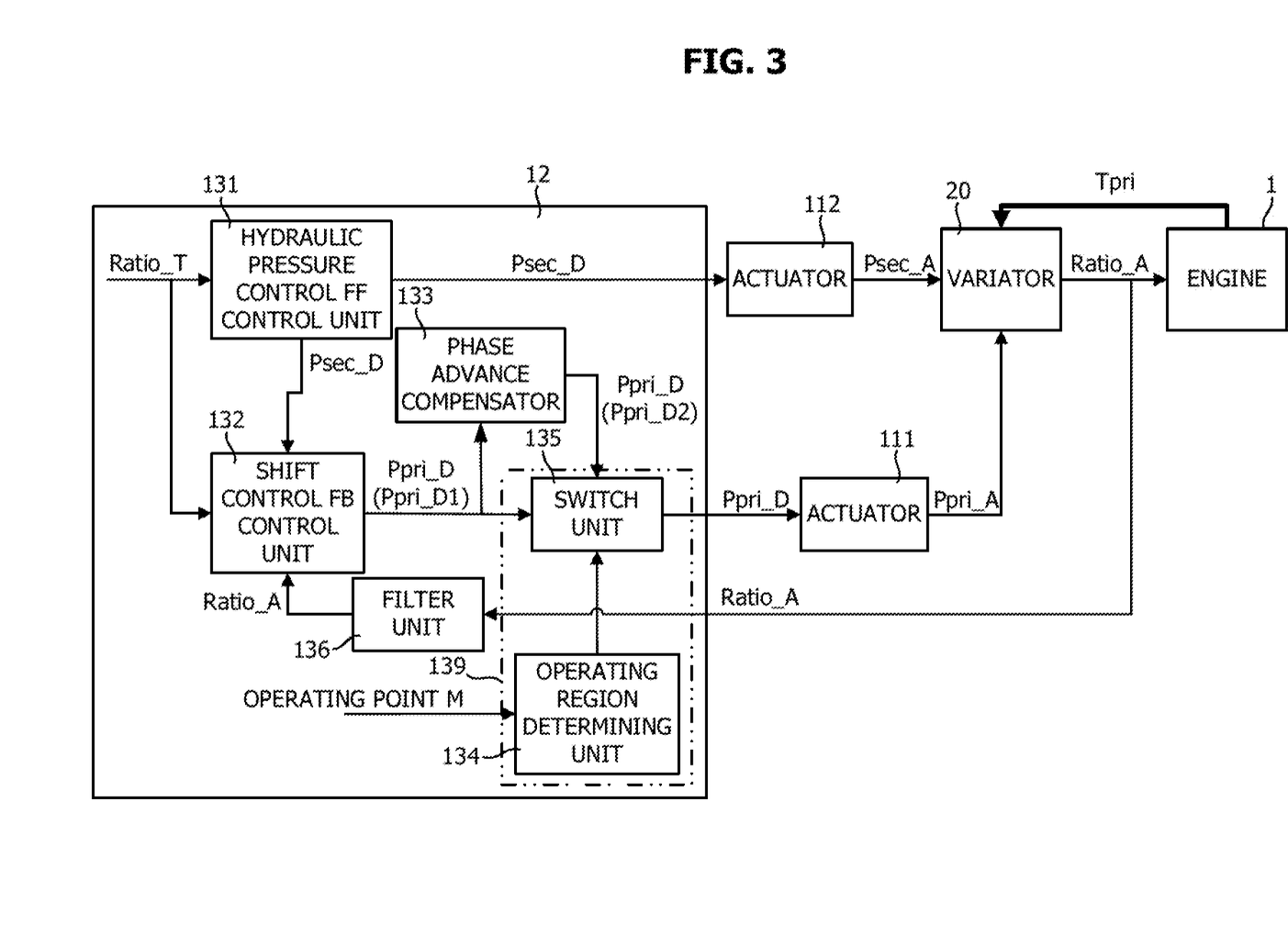
FIG. 3 is a functional block diagram of a transmission controller.

FIG. 3 is a functional block diagram of a controller 12 illustrating a main component of shift control. The controller 12 has a hydraulic pressure control FF control unit 131, a shift control FB control unit 132, a phase advance compensator 133, an operating region determining unit 134, a switch unit 135, and a filter unit 136. FF is an abbreviation of feedforward and FB is an abbreviation of feedback.

The target speed ratio Ratio_T of the variator 20 is input to the hydraulic pressure control FF control unit 131 and the shift control FB control unit 132. The target speed ratio Ratio_T is a final desired shift control value having the speed ratio Ratio as a shift control value and is set in advance in accordance with a driving condition of the vehicle in a shift map. For example, the driving condition of the vehicle is a vehicle speed VSP and an accelerator pedal opening APO.

The hydraulic pressure FF control unit 131 calculates an indicating pressure Psec_D for performing FF control on the secondary pressure Psec, based on the target speed ratio Ratio_T. The indicating pressure Psec_D is set to secure a fastening force of the belt 23. The hydraulic pressure control FF control unit 131 outputs the calculated indicating pressure Psec_D to the shift control FB control unit 132.

The shift control FB control unit 132 calculates an indicating pressure Ppri_D for performing FB control on the primary pressure Ppri, based on the actual speed ratio Ratio_A and the target speed ratio Ratio_T of the variator 20, and the indicating pressure Psec_D. The indicating pressure Ppri_D is set as a transient desired primary pressure until the actual pressure Ppri_A of the primary pressure Ppri reaches a target primary pressure Ppri_T. The target primary pressure Ppri_T is a primary pressure Ppri corresponding to the target speed ratio Ratio_T. The shift control FB control unit 132 outputs the calculated indicating pressure Ppri_D to the phase advance compensator 133 and the switch unit 135.

The phase advance compensator 133 performs phase advance compensation of the indicating pressure Ppri_D. The phase advance compensator 133 may be, for example, configured by a filter having a time constant C (s). The phase advance compensator 133 corresponds to a compensating unit.

The operating region determining unit 134 determines whether an operating point M is in an advance compensating region R and outputs the determination result to the switch unit 135.

Figure 4:
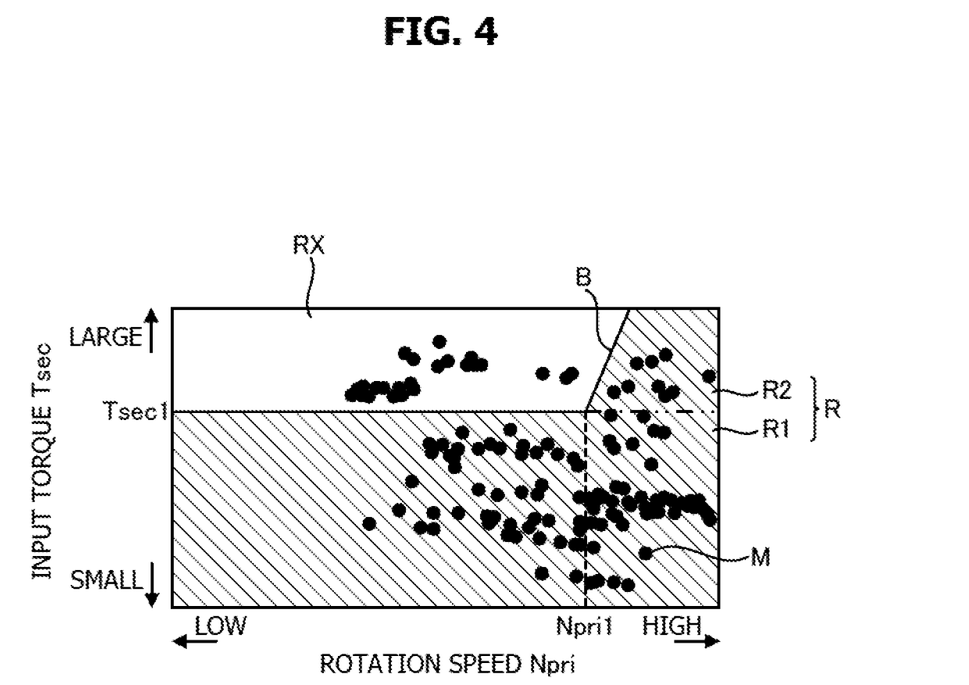
FIG. 4 is a view for explaining an advance compensation region.

FIG. 4 is a view for explaining an advance compensation region R. In FIG. 4, distribution of a plurality of operating points M is illustrated. The advance compensating region R is set in accordance with the rotation speed Npri and an input torque Tsec to the pulley 22. For example, the input torque Tsec may be calculated, for example, as a value obtained by multiplying the engine torque Te by the speed ratio set between the engine 1 and the pulley 22, that is, a gear ratio of the first gear train 3 and the speed ratio Ratio of the variator 20 in this embodiment.

The advance compensating region R includes a region R1 where the input torque Tsec is smaller than a predetermined torque Tsec1. The advance compensating region R further includes a region R2 where the input torque Tsec is equal to or larger than a predetermined torque Tsec1 and the rotation speed Npri is equal to or higher than a predetermined rotation speed Npri1.

The larger the input torque Tsec is, the higher the predetermined rotation speed Npri1 is set. The predetermined rotation speed Npri1 is set to define a boundary B. The boundary B is a straight line in which the rotation speed Npri increases in proportion to the input torque Tsec.

The predetermined torque Tsec1 and the predetermined rotation speed Npri1 are values for defining the input torque Tsec and the rotation speed Npri where the longitudinal vibration is generated and may be set in advance by experiments. The advance compensating region R includes an operating point in a case where the accelerator pedal is depressed with an opening corresponding to a road load, that is, a road load during coast traveling. The operating point M is not distributed in a region where the speed is lower than a rotation speed Npri corresponding to an idle rotation speed of the engine 1.

The region partitioned from the advance compensating region R at the boundary B is a rebound region RX. The rebound region RX will be described below.

However, when the speed ratio Ratio is higher than a predetermined speed ratio Ratio1, in other words, when the speed ratio Ratio is lower than the predetermined speed ratio Ratio1, the advance compensating region R is set. The predetermined speed ratio Ratio1 is a value for defining a speed ratio at which the longitudinal vibration is generated and, for example, is 1. The predetermined speed ratio Ratio1 may be set in advance by experiments.

The advance compensating region R is further set for a case when a changing rate $\alpha$ of the speed ratio Ratio is smaller than a predetermined value $\alpha 1$. The predetermined value $\alpha 1$ is a value for determining a changing rate of the speed ratio Ratio at which the longitudinal vibration is generated and specifically, is set as a determining value for determining whether the speed ratio Ratio is in a normal state. The predetermined value $\alpha 1$ may be set in advance by experiments.

The advance compensating region R is further set for a case when the LU clutch 2a is engaged.

In the exemplary embodiment, the advance compensating region R is further set in accordance with the speed ratio Ratio, the changing rate $\alpha$, and the engagement state of the LU clutch 2a so that the advance compensating region R is further set in accordance therewith. The operating points M is the same as the above.

Therefore, as illustrated in FIG. 3, the operating region determining unit 134 determines whether the operating points M are in the advance compensating region R to also perform the determination. The processing performed by the operating region determining unit 134 will be described below with reference to a flowchart.

The switch unit 135 selects any one of an indicating pressure Ppri_D1 which is an indicating pressure Ppri_D initially calculated by the shift control FB control unit 132 and an indicating pressure Ppri_D2 which is an indicating pressure Ppri_D on which the phase advance compensation is performed by the phase advance compensator 133 as an indicating pressure Ppri_D in accordance with the determination result of the operating region determining unit 134.

When the operating point M is in the rebound region RX, that is, when the operating point M is not in the advance compensating region R, the switch unit 135 selects the indicating pressure Ppri_D1 as the indicating pressure Ppri_D.

When the operating point M is in the advance compensating region R, the switch unit 135 selects the indicating pressure Ppri_D2 as the indicating pressure Ppri_D.

The switch unit 135 configures a setting unit 139 which sets the indicating pressure Ppri_D2 as an indicating pressure Ppri_D, in accordance with the rotation speed Npri, the input torque Tsec, the speed ratio Ratio, and the changing rate $\alpha$, together with the operation region determining unit 134.

An actuator 111 controls the primary pressure Ppri and an actuator 112 controls the secondary pressure Psec. The actuator 111 and the actuator 112 are specifically hydraulic pressure control valves and provided in the hydraulic pressure control circuit 111.

The indicating pressure Ppri_D which is selected from the switch unit 135 is input to the actuator 111 and the indicating pressure Psec_D from the hydraulic pressure control FF control unit 131 is input to the actuator 112. The actuator 111 controls the primary pressure Ppri such that an actual pressure Ppri_A of the primary pressure Ppri becomes the indicating pressure Ppri_D and the actuator 112 controls the secondary pressure Ppri such that an actual pressure Psec_A of the secondary pressure Psec becomes the indicating pressure Psec_D. The actual pressure Ppri_A configures an actual shift control value and the indicating pressure Ppri_D configures a desired shift control value.

The actual pressure Ppri_A corresponding to the indicating pressure Ppri # D input to the variator 20 from the actuator 111 and the actual pressure A corresponding to the indicating pressure Psec_D is input to the variator 20 from the actuator 112. As a result, the speed ratio Ratio is controlled such that the actual speed ratio Ratio_A becomes a desired speed ratio Ratio_D. The actual shift control value and the desired shift control value may be configured by an actual speed ratio Ratio_A and a desired speed ratio Ratio_D which have the speed ratio Ratio as a shift control value.

The fastening force of the belt 23 is secured by the actual pressure Psec_A. Therefore, even though the input torque Tpri to the pulley 21 corresponding to the engine torque Te is input to the variator 20, the slippage of the belt 23 is not caused.

The actual speed ratio Ratio_A is input to the engine 1. Further, the actual speed ratio Ratio_A is input to the shift control FB control unit 132 via the filter unit 136. A value calculated by the controller 12 may be applied as the actual speed ratio Ratio_A, based on the outputs of the rotation speed sensor 4 and the rotation speed sensor 43.

The filter unit 136 performs the filter processing of the actual speed ratio Ratio_A. The filter unit 136 configures a high-order low pass filter. The filter unit 136, for example, has a plurality of first-order low pass filters.

Figure 5:
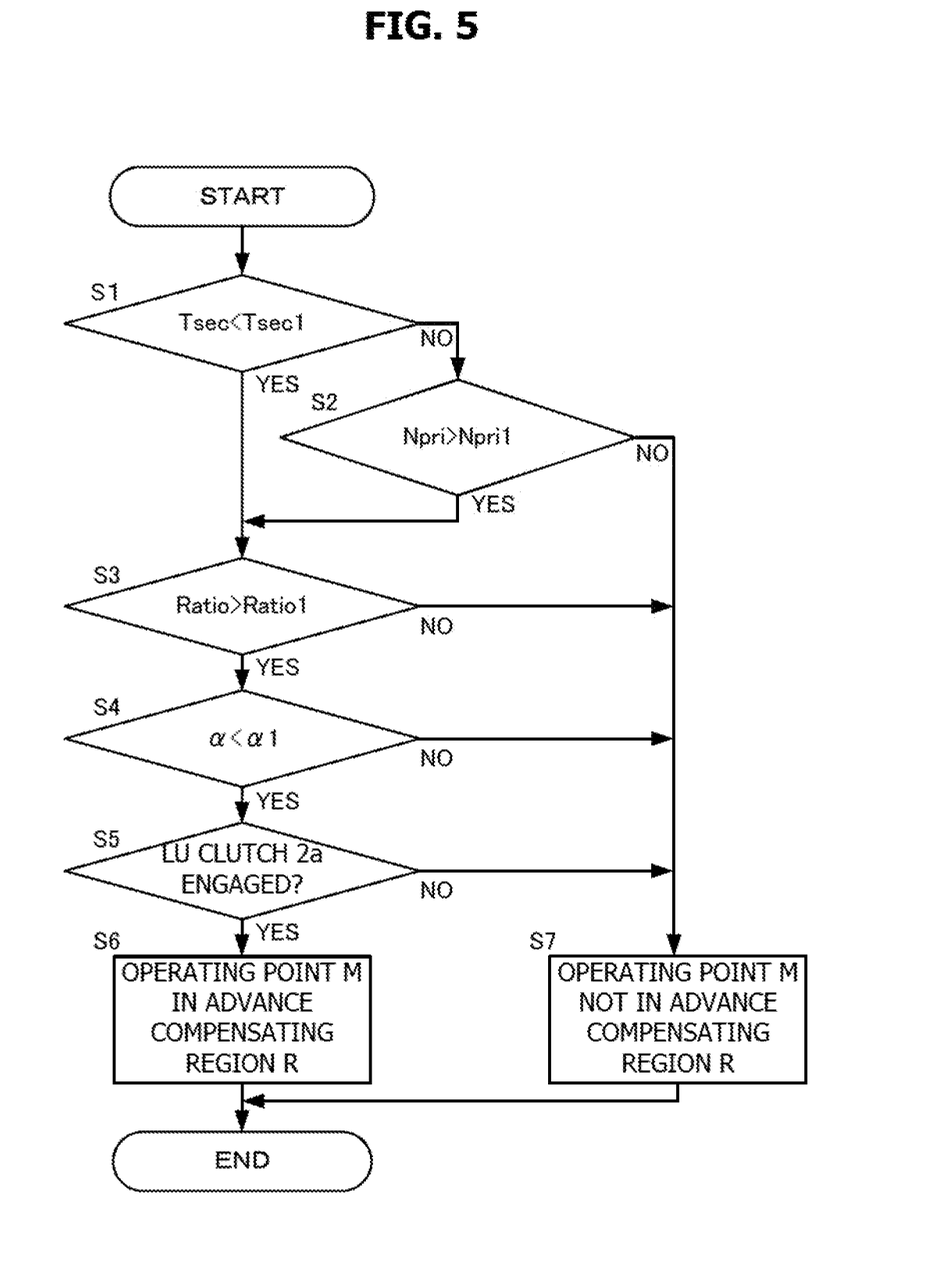
FIG. 5 is a flowchart of an example of control performed by a transmission controller.

FIG. 5 is a flowchart of an example of a processing performed by the controller 12. Specifically, the processings of the flowchart are performed by the operating region determining unit 134.

In step S1, the controller 12 determines whether the input torque Tsec is smaller than a predetermined torque Tsec1. When it is determined to be negative in step S1, the processing proceeds to step S2.

In step S2, the controller 12 determines whether the rotation speed Npri is higher than a predetermined rotation speed Npri1. When it is determined to be positive in step S2, the processing proceeds to step S3. When it is determined to be positive in step S1, the processing also proceeds to step S3.

In step S3, the controller 12 determines whether the speed ratio Ratio is higher than a predetermined speed ratio Ratio1. The operating region determining unit 134, specifically, determines whether the actual speed ratio Ratio_A or the desired speed ratio Ratio_D is higher than a predetermined speed ratio Ratio1.

Whether the speed ratio Ratio is higher than the predetermined speed ratio Ratio may be determined by determining whether OD switch 49 is off. The actual speed ratio Ratio_A and the desired speed ratio Ratio_D may be arithmetic values. When it is determined to be positive in step S3, the processing proceeds to step S4.

In step S4, the controller 12 determines whether the changing rate α is higher than a predetermined value α1. It may be determined whether the changing rate α is higher than a predetermined value α1 by determining whether the speed ratio Ratio is fixed by the driver's manipulation, for example, whether a manual range is selected by a select lever, based on the output of the inhibitor switch 47. When it is determined to be positive in step S4, the processing proceeds to step S5.

In step S5, the controller 12 determines whether the LU clutch 2a is engaged. It may be determined whether the LU clutch 12 is engaged, based on the output of the hydraulic pressure sensor 50.

When it is determined to be positive in step S5, the processing proceeds to step S5 and the controller 12 determines that the operating point M is in the advance compensating region R.

When it is determined to be negative in step S5, the processing proceeds to step S7 and the controller 12 determines that the operating point M is not in an advance compensating region R. When it is determined to be negative in steps S2 to S4, the same is applied.

In other words, in step S7, it is determined that the operating point M is in the rebound region R. In the rebound region Rx, when the indicating pressure Ppri_D2 is set as an indicating pressure Ppri_D, the vibration of the actual pressure Ppri_A may be caused as a result of the vibration of the indicating pressure Ppri_D.

Therefore, when the operating point M is not in the advance compensating region R, by setting the indicating pressure Ppri_D1 as the indicating pressure Ppri_D, not only the stability of the speed ratio Ratio is not unnecessarily increased, but also the vibration of the actual pressure Ppri_A is prevented.

Next, a main operating effect of the controller 12 will be described.

The controller 12 configures a control device of a continuously variable transmission which performs shift control of the transmission 4 such that the actual pressure Ppri_A becomes an indicating pressure Ppri_D. The controller 12 has a phase advance compensator 133 which performs advance compensation of the indicating pressure Ppri_D and a setting unit 139 which sets an indicating pressure Ppri_D2 at which the advance compensation is performed by the phase advance compensator 133 as an indicting pressure Ppri_D in accordance with the rotation speed Npri, the input torque Tsec, the speed ratio Ratio, and the changing rate α.

By the controller 12 with the above-described configuration, it is possible to set the indicating pressure Ppri_D2 in the region where the longitudinal vibration is generated, as the indicating pressure Ppri_D. Therefore, it is possible to improve the stability of the speed ratio Ratio by the phase advance compensation of the indicating pressure Ppri_D as necessary and thus it is possible to appropriately improve the longitudinal vibration of the transmission 4 by converging the longitudinal vibration.

Further, by the controller 12 with the above-described configuration, the stability of the speed ratio Ratio is increased by the phase advance compensation so that the control responsiveness of the speed ratio Ratio is also improved. Further, by the controller 12 with the above-described configuration, the stability of the speed ratio Ratio is increased as necessary so that when it is not necessary to increase the stability of the speed ratio Ratio, the vibration of the actual pressure Ppri_A may be suppressed.

The controller 12 further includes a filter unit 136 which performs the filter processing of the actual speed ratio Ratio_A and configures a higher-order low pass filter.

By the controller 12 with the above-described configuration, as compared with a case when a slight delay occurs in a region below a frequency to be eliminated using the first-order low pass filter, the delay is improved and thus, the phase of the indicating pressure Ppri_D may be further advanced.

When the operating point M is in the advance compensating region R, the setting unit 139 in the controller 12 sets the indicating pressure Ppri_D2 as the indicating pressure Ppri_D.

By the controller 12 with the above-described configuration, among regions in accordance with the rotation speed Npri and the input torque Tsec, a region where the longitudinal vibration is generated is considered as an advance compensating region R and the stability of the speed ratio Ratio is increased so that the longitudinal vibration may be appropriately improved.

In the controller 12, the advance compensating region R includes a region R1 where the input torque Tsec is smaller than a predetermined torque Tsec1. By the controller 12 with the above-described configuration, it is possible to appropriately set the advance compensating region R.

In the controller 12, the advance compensating region R further includes a region R2 where the input torque Tsec is equal to or larger than a predetermined torque Tsec1 and the rotation speed Npri is equal to or higher than a predetermined rotation speed Npri1. The larger the input torque Tsec is, the higher the predetermined rotation speed Npri1 is set. By the controller with the above-described configuration, it is possible to further appropriately set the advance compensating region R.

In the controller 12, when the speed ratio Ratio is higher than the predetermined speed ratio Ratio1, the setting unit 139 sets the indicating pressure Ppri_D2 as the indicating pressure Ppri_D. By the controller 12 with the above-described configuration, the longitudinal vibration may be appropriately improved in accordance with the speed ratio Ratio.

In the controller 12, when the changing rate $\alpha$ is lower than the predetermined value $\alpha$1, the setting unit 139 sets the indicating pressure Ppri_D2 as the indicating pressure Ppri_D. By the controller 12 with the above-described configuration, the longitudinal vibration may be appropriately improved in accordance with the changing rate $\alpha$.

In the exemplary embodiment, the transmission 4 may input the power via a torque converter 2 with the LU clutch 2a. When the LU clutch 2a is engaged, the controller 12 further sets the indicating pressure Ppri_D2 as the indicating pressure Ppri_D. By the controller 12 with the above-described configuration, the longitudinal vibration may be appropriately improved in accordance with the state of the LU clutch 2a.

Although the embodiment of the present invention has been described above, the above-mentioned embodiment merely shows a part of the application example of the present invention, but the technical scope of the present invention is not limited to the specific configuration of the above embodiment.

In the above-described embodiment, it has been described that the setting unit 139 sets the indicating pressure Ppri_D2 as the indicating pressure Ppri_D according to all of four parameters of the rotation speed Npri, the input torque Tsec, the speed ratio Ratio, and the change rate $\alpha$.

However, the setting unit 139 may be configured to set the indicating pressure Ppri_D2 as the indicating pressure Ppri_D in accordance with at least one parameter of the input torque Tsec, the speed ratio Ratio, or the change rate $\alpha$. Also in this case, the longitudinal vibration may be appropriately improved by appropriately increasing the stability of the speed ratio Ratio in relation to the parameter.

In the above-described exemplary embodiment, it has been described that the advance compensating region R is further set in accordance with the speed ratio Ratio, the changing rate $\alpha$, and the engagement state of the LU clutch 2a so that the advance compensating region R is further set in accordance therewith.

However, the controller 12, for example, does not determine the speed ratio Ratio, the changing rate $\alpha$, and the engagement state of the LU clutch 2a when it is determined whether the operating point M is in the advance compensating region, but may be separately determine the speed ratio Ratio, the changing rate $\alpha$, and the engagement state of the LU clutch 2a.

In the above-described embodiment, it has been described that the operating region determining unit 134 and the switch unit 135 configure the setting unit 139. However, it may be understood that the setting unit 139 is configured by the switch unit 135 which selects the indicating pressure Ppri_D according to the determining result of the operating region determining unit 134.

In the above-described embodiment, it has been described that the controller 12 is configured as a control device of the continuously variable transmission. However, the control device of the continuously variable transmission may be implemented by a plurality of controllers.

This application claims the priority based on Japanese Patent Application No. 2016-045497 filed with the Japanese Patent Office on Mar. 9, 2016, the entire contents of which is incorporated herein by reference.

The invention claimed is:

1. A control device configured to perform shift control of a continuously variable transmission such that an actual shift control value becomes a desired shift control value, the control device comprising
a controller configured to:
perform advance compensation of the desired shift control value; and
set a compensated desired shift control value, on which the advance compensation is performed, or the desired shift control value, as a final value for the desired shift control value, in accordance with at least one of an input-side rotation speed of the continuously variable transmission, an input torque to a driven-side rotation element of the continuously variable transmission, a speed ratio of the continuously variable transmission, or a change rate of the speed ratio.

2. The control device according to claim 1, wherein the controller comprises a filter configured to perform filter processing of the actual shift control value and form a higher-order low pass filter.

3. The control device according to claim 1, wherein the controller is configured such that when an operating point in accordance with the input-side rotation speed and the input torque is in an advance compensating region set in accordance with the input-side rotation speed and the input torque, the controller sets the compensated desired shift control value as the desired shift control value.

4. The control device according to claim 3, wherein the advance compensating region includes a region where the input torque is smaller than a predetermined torque.

5. The control device according to claim 4, wherein the advance compensating region further includes a region where the input torque is equal to or higher than the predetermined torque and the input-side rotation speed is equal to or higher than a predetermined rotation speed, and the predetermined rotation speed is set to be higher as the input torque becomes higher.

6. The control device according to claim 1, wherein the controller is configured such that when the speed ratio is higher than a predetermined speed ratio, the controller sets the compensated desired shift control value as the desired shift control value.

7. The control device according to claim 1, wherein the controller is configured such that when the change rate is lower than a predetermined value, the controller sets the compensated desired shift control value as the desired shift control value.

8. The control device according to claim 1, wherein the continuously variable transmission is configured to receive a power input via a torque converter with a lock-up clutch, and the controller is configured such that when the lock-up clutch is engaged, the controller sets the compensated desired shift control value as the desired shift control value.

9. A control method for performing shift control of a continuously variable transmission such that an actual shift control value becomes a desired shift control value, the control method comprising:
performing advance compensation of the desired shift control value; and
setting a compensated desired shift control value, on which the advance compensation is performed, or the desired shift control value, as a final value for the desired shift control value, in accordance with at least one of a rotation speed of an input side of the continuously variable transmission, an input torque to a driven-side rotation element of the continuously variable transmission, a speed ratio of the continuously variable transmission, or a change rate of the speed ratio.

10. A control device configured to perform shift control of a continuously variable transmission such that an actual shift control value becomes a desired shift control value, the control device comprising:
means for performing advance compensation of the desired shift control value; and
means for setting a compensated desired shift control value, on which the advance compensation is performed, or the desired shift control value, as a final value for the desired shift control value, in accordance with at least one of a rotation speed of an input side of the continuously variable transmission, an input torque to a driven-side rotation element of the continuously variable transmission, a speed ratio of the continuously variable transmission, or a change rate of the speed ratio.

* * * * *